United States Patent
Virgin

(10) Patent No.: US 7,266,088 B1
(45) Date of Patent: Sep. 4, 2007

(54) METHOD OF MONITORING AND FORMATTING COMPUTER NETWORK DATA

(75) Inventor: Gregory Scott Virgin, Silver Spring, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 783 days.

(21) Appl. No.: 10/808,165

(22) Filed: Mar. 24, 2004

(51) Int. Cl.
*H04J 1/16* (2006.01)

(52) U.S. Cl. .................. 370/252; 370/235; 370/389; 709/224

(58) Field of Classification Search ............... 370/252, 370/253, 254, 255, 235, 389, 229, 396, 400, 370/401, 351, 353; 709/224, 225
See application file for complete search history.

(56) References Cited

U.S. PATENT DOCUMENTS

| 5,878,420 | A | 3/1999 | de la Salle |
| 6,243,667 | B1 | 6/2001 | Kerr et al. |
| 6,651,099 | B1 | 11/2003 | Dietz et al. |
| 6,847,613 | B2 * | 1/2005 | Mimura et al. ............. 370/235 |
| 6,870,817 | B2 * | 3/2005 | Dolinar et al. ............. 370/252 |

* cited by examiner

*Primary Examiner*—Chi Pham
*Assistant Examiner*—Alexander O. Boakye
(74) *Attorney, Agent, or Firm*—Jennifer P. Ferragut

(57) ABSTRACT

The present invention is a method of monitoring and formatting data in a computer network. The first step of the method is creating a data flow table. The second step is receiving a data packet. The third step is identifying the data flow table fields that correspond with the data packet. The fourth step is analyzing the data packets. The fifth step of the method is storing the analysis results. The sixth step is updating the data flow table. The seventh step is comparing the data packets and the data flow table. The eighth step is storing the results of the comparative analysis. The ninth step is exporting terminated flows. The tenth step of the method is exporting metadata.

19 Claims, 1 Drawing Sheet

METHOD OF MONITORING AND FORMATTING COMPUTER NETWORK DATA

FIELD OF THE INVENTION

This invention relates to multicomputer data transferring and, more particularly, to multicomputer data transferring utilizing computer network management and monitoring.

BACKGROUND OF THE INVENTION

It has become common in recent years for businesses to connect their computers through an internal network. This network allows each individual computer to communicate with the other computers in the business, allowing data to be quickly and easily transmitted from one employee to another. As many of these businesses have found, this can result in substantial financial savings due to increased efficiency. As these same businesses may have also discovered, however, this solution is not without its problems.

The primary concern for many businesses is that the business' network is vulnerable to breach by unwanted intruders, or "hackers." In some cases, hackers attempt to invade systems to gain access to files, such as confidential code or other proprietary information. In other cases hackers enter systems with malicious intent and attempt to plant corrupt data on the system, such as a computer virus. In both cases, the attack is much easier if the network is connected to the Internet or another external network. No matter the reason, hackers are never desired in a network environment because after gaining access to a single machine it is generally fairly simple to access all other machines on the network.

In an attempt to prevent the problems discussed above, many vulnerability assessment tools have been produced which allow system administrators to examine computers in a network environment to determine vulnerabilities to a potential attack. One method of detecting vulnerabilities is to collect and analyze data from the computers as it passes through routers on the network. One particular representation of this data, which can be produced by many commercial network routers, is "flow" data summaries. A flow record summarizes the participants, bandwidth, ports and routing specifics of a communication between two computers, and is a desirable data source for computer network security analysis because of its compact size and ease of instrumentation. Implementations of this method of data aggregation include Cisco Netflow and the open-source "cflowd."

Flow records can be analyzed to determine if the network has been breached. This process requires detailed, reliable, data records that do not rely on sampling or further aggregation of records. The problem with this kind of flow data production is that, in addition to its flow data production function, each flow-producing router must perform significant data routing functions for network traffic. When traffic flow is heavy, a primary function that is sacrificed is flow data production, thus facilitating undetected intrusion by a hostile individual. Additionally, the flows generated by many routers have been shown to be imprecise or inaccurate. Flows generated by routers also lack information that could be helpful in detecting network intruders as flow data was originally intended for network engineering statistics. It is therefore necessary in the art to create a data monitoring tool for network intrusion detection that produces security enhanced flow records without reliance on routers.

U.S. Pat. No. 5,878,420, entitled "NETWORK MONITORING AND MANAGEMENT SYSTEM," discloses a system for monitoring a network wherein a series of sampling assemblies are connected to a selection of Local Area Networks (LANS) throughout the network to extract data packets from these LANS for traffic analysis. The data is analyzed and stored in a database. The present invention does not use this method to manage data. U.S. Pat. No. 5,878,420 is hereby incorporated by reference into the specification of the present invention.

U.S. Pat. No. 6,243,667, entitled "NETWORK FLOW SWITCHING AND DATA EXPORT," discloses a method for switching in computer networks in response to message flow patterns. In this method, routers identify a new message flow and determine the proper processing for the packets in the flow. For every packet thereafter, the router determines if the packet belongs to an existing flow and, if it does, analyzes it in the same manner as the packets in that flow were previously processed. The present invention does not process packets in this manner. U.S. Pat. No. 6,243,667 is hereby incorporated by reference into the specification of the present invention.

U.S. Pat. No. 6,651,099, entitled "METHOD AND APPARATUS FOR MONITORING TRAFFIC IN A NETWORK," discloses a method of examining packets passing through a computer network by extracting packet information from each computer on a network using a packet acquisition device, examining these packets to determine if the packets are of the same flow, and updating the existing flow entry or creating a new flow entry in a flow database as appropriate. The present invention does not examine packet information in this manner. U.S. Pat. No. 6,651,099 is hereby incorporated by reference into the specification of the present invention.

Though many methods exist for collecting and analyzing data packets, none provide a method that accurately and efficiently processes all packets passing through the system. Further, no prior art method discloses utilizing the analysis-enhanced flow data to create a practical intrusion detection system.

SUMMARY OF THE INVENTION

It is an object of the present invention to monitor data traffic in a network environment.

It is a further object of the present invention to monitor data traffic in a network environment for the purpose of intrusion detection.

The present invention is a method of monitoring and producing summary data in a computer network. The first step of the method is creating a data flow table.

The second step of the method is receiving a data packet.

The third step of the method is identifying the data flow table fields that corresponds with the data packet being analyzed.

The fourth step of the method is analyzing the data packet.

The fifth step of the method is storing the analysis results.

The sixth step of the method is updating the data flow table with the data from the data packet.

The seventh step of the method is comparing the analyzed data packets and flow records accumulated in the data flow table.

The eighth step of the method is storing the results of the comparative analysis.

The ninth step of the method is exporting timed out and terminated flows.

The tenth step of the method is exporting alarms and metadata based on the analysis performed in the fourth step and eighth step of the method and cumulatively collected in the sixth step of the method.

DETAILED DESCRIPTION OF THE PREFERRED EMBODIMENTS

Figure 1:
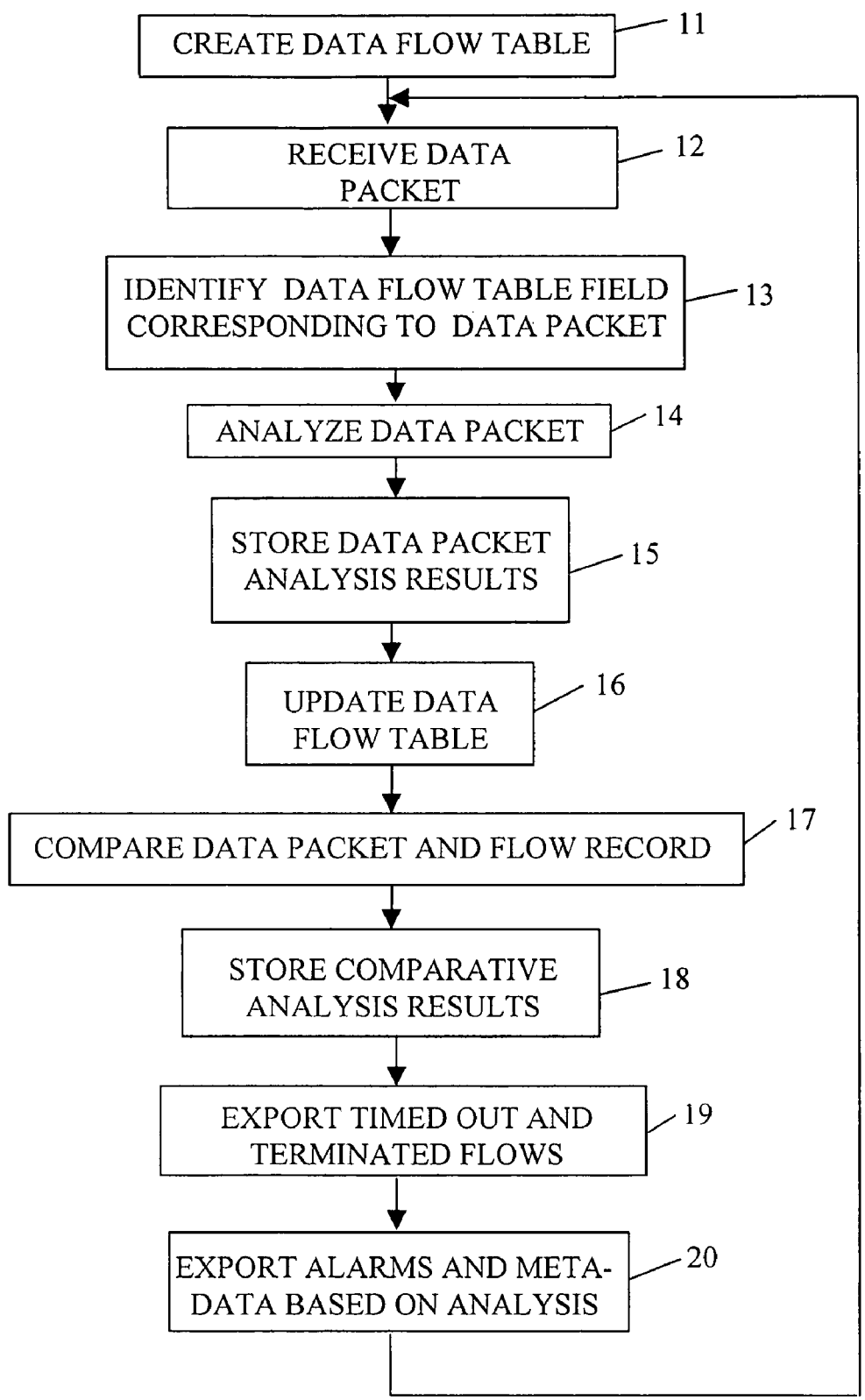
FIG. 1 is a flow chart of a preferred embodiment of the present invention.

The present invention is a method for monitoring, summarizing and analyzing data in a computer network by analyzing packets and producing flow records on a server. FIG. 1 is a list of the steps of the method of the present invention. The first step 11 of the method of the present invention is creating a data flow table. This table is the mechanism by which packets are aggregated, or "summarized" in a flow record. A flow table is preferably a table having sections for storing data aligned in rows and columns, but can be any other data storage method capable of operating as described below. The columns preferably are assigned to specific flows, flows typically coming from specific computers on a network and having a number of packets representing information being transferred from that computer. Flows may be defined using other criteria, as would be obvious to one of skill in the art. The rows are preferably assigned criteria for which values exist in data packets being transferred from computers on the network. Data packets will be described in further detail with reference to the second step 12 of the method below. Such values, include, but are not limited to, length of packet, synchronization information, packet number in the sequence of packets being transferred, network protocol (such as e-mail, web page, streaming video, etc.), originating IP address and destination IP address. Based on information in the data packets, each data packet has a corresponding field in the data flow table. Each field in the flow table is a summary of all of the packets that take part in a data flow between two hosts. Additional fields may exist in the data flow table for security analysis purposes, as will be explained in greater detail below.

The second step 12 of the method of the present invention is receiving a data packet. A packet is a collection of computer data including information about, among other things, the origin and destination of data transmitted over a network. As would be obvious to one of skill in the art, data packet collection ultimately involves collecting all data packets in the system. Many methods for performing this step are well known and commonly used in the art. Any suitable method could be used in conjunction with this invention.

The third step 13 of the method of the present invention is identifying the data flow table fields that corresponds with the data in the data packet being analyzed. In this step, in much the same way routers produce flow records, it is determined whether or not the data packet is part of an existing data flow or is the beginning of a new data flow. As was previously explained, information in each data packet links the data packet to a specific flow. One field the data packet indicates which field the data packet belongs to. This is used to determine which fields of the data flow table the information in the data packet will ultimately populate.

Once the correct flow table fields are located this information about the data flow table fields is placed in memory—no action is taken to alter the flow record by placing the data packet in the data flow tables or to alter the data packet at this point.

The fourth step 14 of the method of the present invention is analyzing the data packets to determine if any data in the data packet falls outside a set of user-defined values. In this step, a data packet is examined to determine if any of the data falls outside of user definable conditions or meets certain specified criteria. Specifically, the user will preferably a threshold value above which or below which a value in each field must not fall, a range a value must not fall outside, or a list of set values data in a specified field must equal (such as IP addresses.) For example, a user can define a threshold length for a data packet. If the length of the data packet exceeds this threshold length, a flag or field to that effect will be associated with that data packet in the system. This process may be performed for any other data contained in the data packet, as desired by the user, and does not necessarily have to pertain to finite values. The user may also define other conditions, such as IP addresses, from which the data packets should not vary and compare the data packet values against these criteria during analysis. Again, many such criteria exist and would be obvious to one skilled in the art.

The fifth step 15 of the method of the present invention is storing the analysis results. The results of the fourth step 14 of the method are stored in memory with the data packet, preferably using one of the following two methods: adding additional fields to the flow table with each field corresponding to a value in the data packet, or switching bits in a bitfield wherein a bit switch indicates that a particular condition has been met.

The first method functions as explained in detail with reference to the second step 12 of the method, and therefore will not be explained in detail here. In summary, fields of the data flow table are assigned criteria that correspond to values in the data packet. These values are identified and the appropriate information is inserted into the corresponding fields in the data flow table.

The second method referenced above involves creation of a bitfield. As is obvious to one of skill in the art, a bitfield is a table having conditions assigned to each cell wherein each cell contains a bit that is switched between the values 0 and 1 if the data packet meets the condition assigned to that cell. For example, if a certain cell is associated with packet size and the user defines a threshold packet size, if the data packet exceeds the specified packet size the value of the bit in the specified cell will be changed. This method can be used to store information about any value in a data packet. Any other suitable storage method could be used in conjunction with the fifth step 15 of the method, many of which are well known and commonly used in the art.

The sixth step 16 of the method of the present invention is updating the data flow table with the data from the data packet. If the current packet is the first packet of the data communication it corresponds to, a new entry is added to each of the fields of the data flow table that correspond to the flow of the data packet being analyzed. The data packet inserted into the data flow table in the sixth step 16 is the data packet that was analyzed in the third step 13 of the method. In the third step 13 of the method the data packet was analyzed to determine the fields in the data flow table into which the values in the data packet should be entered. This information is used in the sixth step 16 of the method to insert the values from the data packet into the data flow table. If the data packet being used to update the table is not the first packet being entered into the system, it is likely that some fields in the data flow table will already have data in them. In this case if data is to be inserted into a field that already includes data, the field is simply updated with data from the packet being parsed. In a preferred embodiment the system updates the fields by adding the value being updated to a list of values obtained from the packets that have already been parsed. Many other methods of combining values from data packets, such as compiling a list of values such as IP addresses, are well known and commonly used in the art, and any such method can be used in conjunction with this invention. The compilation of data from multiple data packets creates the flow records for each flow in the data flow table.

The seventh step 17 of the method of the present invention is comparing the analyzed data packet and flow records accumulated in the data flow table. This step involves comparing the data packet analyzed in the fourth step 14 of the method to the flow records of the sixth step 16 of the method. Each criteria in the data packet that was analyzed in the fourth step 14 of the method is compared to the same criteria for the flow to which that data packet corresponds in the data flow table. By doing this, the system can determine if an anomaly exists in that data packet. The user can define what conditions must exist for the comparison between the data packet/data flow table field to suggest an anomaly. For example, the user may determine that a certain difference between the average of the values already stored in the field being updated in the data flow table and the value for the same criteria in the data packet means the data packet is anomalous. There are several advantages to performing a comparative analysis, as opposed to an analysis of single data packets or even single data flows. An example of this analysis is showing the distribution of byte transfers over time. An analysis without this capability can only show the byte count for an individual flow without the cumulative data analysis available through the present invention.

In an alternative embodiment, the comparative analysis of the seventh step 17 of the method is performed prior to the sixth step 16 of the method—updating the data flow table. This is either in addition to or as an alternative to performing the comparative analysis after updating the data flow table. Performing the comparative analysis prior to updating the data flow table allows the user to isolate anomalous data prior to updating the data flow table with said anomalous data. If the comparative analysis is performed first, the system could be appropriately programmed to ignore anomalous data in successive comparative analyses or anomalous data could be left out of the data flow table or entered into additional fields for further analysis. This analysis uncovers anomalies and that may not otherwise be uncovered. There are additional advantages of performing the comparative analysis prior to updating the data flow table, as will be obvious to one of skill in the art.

The eighth step 18 of the method is storing the results of the comparative analysis. The results of this analysis are preferably stored in additional fields of the data flow table. Alternatively the results of the analysis can be stored in a bitfield as described with respect to the fifth step 15 of the method. The bitfield serves the purpose of maintaining information on whether certain conditions have been met by the data packets of each flow or by the flow itself. Each bit in the bitfield is a Boolean value (either a 1 or a 0) for a specific condition. Again, this process is explained in detail with reference to the fifth step 15 of the method. Additional fields are added to the data flow table for analysis results values that require more than a simple Boolean value. Examples of such results are byte count, originating address, and time-to-live (TTL) value.

The ninth step 19 of the method of the present invention is exporting timed out and terminated flows. An timed out or terminated flow is an accumulation of packet data associated with a certain flow that has been defined as expired by the user. Users typically define expiration based on periods of inactivity or periods of activity, or may base expiration on the existence of certain flags in the data packets of the flow that indicate the communication between the two computers is ending. These timeouts and termination values can be user-defined and are familiar to those familiar with the art. When the flow data is exported, not all summary and analysis data needs to be exported from the data flow table or other portions of the flow record itself (such as bitfields, if used.) It is often more efficient and meaningful for certain data collected during the processing of the system to be exported and for other data to be retained for further analysis or to be exported separately, as will be explained in further detail below with reference to the tenth step 20 of the method. Several different variations of exporting and retaining data are possible, and can be defined by the user based on user preferences. The specially defined fields used during the analyses steps listed above, specifically the second 12, fifth 15 and eighth 18 steps of the method, are examples of fields that may be kept separate from the fields exported in the ninth step 19 of the method. Any combination of fields may be exported as would be obvious to one of skill in the art, and all such variations are anticipated by this invention.

The tenth step 20 of the method of the present invention is exporting alarms and metadata based on the analysis performed in the fourth step 14 and eighth step 18 of the method and cumulatively collected in the sixth step 16 of the method. Once the flow record is exported in the ninth step 19 of the method, other values that are variable and user-definable can be exported through a separate mechanism from flow records. These values are those extra fields defined in the analyses steps of the method, and referenced in the second 12, fifth 15 and eighth 18 steps of the method as mentioned above. The user can define which of these records will be exported in the tenth step 20 of the method. In a preferred embodiment, records are only exported if they meet a user defined condition such that the value contained in the data flow table field suggests there is some vulnerability or other anomaly on a computer or other element in the network. An example is if, through the steps referenced above, information is ascertained that indicates one computer taking part in a communication has a security vulnerability, the information suggesting that vulnerability that is stored in a field in the data flow table is exported in the tenth step 20 of the method. The user defines the conditions that suggest a security vulnerability exists. One such vulnerability may be if time-to-live (TTL) value for a particular data packet differs from the TTL values for the packets already analyzed and inserted into the data flow table for that flow by a certain value, suggesting an intruder is monitoring the system. There are two possibilities. If a field exists in the flow record for TTL values, then the user may have defined what an anomalous difference in TTL values is and a field may have already been created for anomalous TTL values. If a special field to this effect is created in one of the steps referenced above, the user may define this field as one that should be exported in the tenth step 20 of the method. If no field exists in the flow record for TTL values, a separate field may exist for TTL values unrelated to flows. If this is the case, the user may define a threshold value that the TTL value should not exceed (or a value the TTL value should not fall beneath.) If the TTL value for a data packet differs from this value, the information is exported in the tenth step 20 of the method. This is in effect an alarm system for the network. As noted above, values from any fields in the data flow table can be exported in the tenth step 20 of the method, according to user preferences. Many fields would be useful for vulnerability assessment purposes, as would obvious to one of skill in the art, and all such fields are anticipated by this invention.

The second step 12 through tenth step 20 of the method loop continuously as this invention functions until the user terminates the process. Many methods of terminating the process are possible and would be obvious to one of skill in the art, such as shutting down the network environment.

What is claimed is:

1. A method of analyzing data comprising the steps of:
    a) creating a data flow table having an entry for each unique data flow, where each data flow entry includes fields selected from the group of fields consisting of origin IP address, destination IP address, time-to-live value, packet length, packet number, start time, stop time, origin port, destination port, protocol, any other suitable value and any combination thereof;
    b) receiving a data packet that includes at least one of said fields listed in step a);
    c) comparing said at least one field of said data packet to at least one user-definable set of values;
    d) adding at least one error field to said data flow table that corresponds with said at least one field of said data packet identified in step c) that is outside of said at least one user-definable set of values;
    e) entering in said at least one error field said at least one field of said data packet identified in step c) that is outside of said user-definable set of values;
    f) entering in said data flow table said at least one field of said data packet identified in the last step that is within the at least one user-definable set of values;
    g) comparing at least one corresponding entry in said data flow table to said at least one field of said data packet entered into said data flow table in the last step;
    h) adding at least one anomaly field to said data flow table if said field of said data packet differs from said corresponding entry in said data flow by a user-definable value or set of values;
    i) entering in said at least one anomaly field said at least one field of said data packet identified in step h) that differs from said entry of said data flow table by a user-definable value or set of values;
    j) identifying data flows in said data flow table for data flows that have ended;
    k) transmitting data flows, data from said at least one error field, and data from said at least one anomaly field for said data flows that have ended; and
    l) returning to step b) if there are additional data packets to be processed.

2. The method of claim 1, wherein the step of adding at least one error field comprises adding at least one bitfield, said at least one bitfield containing at least one bit, said bit being set to either 1 or 0 as defined by the user.

3. The method of step 2, wherein said step of entering in said at least one error field at least one data packet comprises switching said at least one bit.

4. The method of claim 3, wherein said data flow table consist of a number of data cells arranged in rows and columns.

5. The method of claim 4, wherein said protocol value may be selected from the group of values consisting of e-mail protocols, web page protocols, streaming video protocols, streaming audio protocols, ftp protocols, or any other suitable protocol.

6. The method of claim 5, wherein said step of identifying data flows that have ended comprises identifying data flows in said data flow table for data flows that have ended, wherein a flow that has ended represents a completed information transfer between computers in a network according to a user-defined set of criteria, said user-defined criteria defining termination based on periods of inactivity or periods of activity, or the existence of specific flags in said at least one data packet, said flags indicating the communication between the two computers has ended.

7. The method of claim 6, wherein said user-definable set of values is chosen from the group of user-definable sets of values consisting of a threshold value below which said at least one field of said data packet must not fall, a threshold value above which said at least one field of said data packet must not fall, a range between which said at least one field of said data packet must fall, a list of values at least one of which said at least one field of said data packet must equal, any other suitable set of values, and any combination thereof.

8. The method of claim 1, wherein said data flow table consist of a number of data cells arranged in rows and columns.

9. The method of claim 8, wherein said protocol value may be selected from the group of values consisting of e-mail protocols, web page protocols, streaming video protocols, streaming audio protocols, ftp protocols, or any other suitable protocol.

10. The method of claim 9, wherein said step of identifying data flows that have ended comprises identifying data flows in said data flow table for data flows that have ended, wherein a flow that has ended represents a completed information transfer between computers in a network according to a user-defined set of criteria, said user-defined criteria defining termination based on periods of inactivity or periods of activity, or the existence of specific flags in said at least one data packet, said flags indicating the communication between the two computers has ended.

11. The method of claim 10, wherein said user-definable set of values is chosen from the group of user-definable sets of values consisting of a threshold value below which said at least one field of said data packet must not fall, a threshold value above which said at least one field of said data packet must not fall, a range between which said at least one field of said data packet must fall, a list of values at least one of which said at least one field of said data packet must equal, any other suitable set of values, and any combination thereof.

12. The method of claim 1, wherein said protocol value may be selected from the group of values consisting of e-mail protocols, web page protocols, streaming video protocols, streaming audio protocols, ftp protocols, or any other suitable protocol.

13. The method of claim 1, wherein said step of identifying data flows that have ended comprises identifying data flows in said data flow table for data flows that have ended, wherein a flow that has ended represents a completed information transfer between computers in a network according to a user-defined set of criteria, said user-defined criteria defining termination based on periods of inactivity or periods of activity, or the existence of specific flags in said at least one data packet, said flags indicating the communication between the two computers has ended.

14. The method of claim 1, wherein said user-definable set of values is chosen from the group of user-definable sets of values consisting of a threshold value below which said at least one field of said data packet must not fall, a threshold value above which said at least one field of said data packet must not fall, a range between which said at least one field of said data packet must fall, a list of values at least one of which said at least one field of said data packet must equal, any other suitable set of values, and any combination thereof.

15. The method of claim 1, wherein the step of adding at least one anomaly field comprises adding at least one bitfield, said at least one bitfield containing at least one bit, said bit being set to either 1 or 0 as defined by the user.

16. The method of claim 15, wherein said step of entering in said at least one anomaly field at least one data packet comprises switching said at least one bit.

17. The method of claim 16, wherein said data flow table consist of a number of data cells arranged in rows and columns.

18. The method of claim 17, wherein said protocol value may be selected from the group of values consisting of e-mail protocols, web page protocols, streaming video protocols, streaming audio protocols, ftp protocols, or any other suitable protocol.

19. The method of claim 18, wherein said step of identifying data flows that have ended comprises identifying data flows in said data flow table for data flows that have ended, wherein a flow that has ended represents a completed information transfer between computers in a network according to a user-defined set of criteria, said user-defined criteria defining termination based on periods of inactivity or periods of activity, or the existence of specific flags in said at least one data packet, said flags indicating the communication between the two computers has ended.

* * * * *